June 21, 1955     J. FAVRE     2,711,117

CINEMATOGRAPHIC CAMERA

Filed May 31, 1951

INVENTOR

Jules Favre.

BY Emory L. Groff

ATTORNEY

2,711,117

CINEMATOGRAPHIC CAMERA

Jules Favre, Neuchatel, Switzerland, assignor to Paillard S. A., Sainte-Croix, Switzerland, a company of Switzerland Application May 31, 1951, Serial No. 229,037

Claims priority, application Switzerland June 5, 1950

2 Claims. (Cl. 88—17)

This application relates to a device controlling a film driving mechanism and including a lever biased to a position stopping the mechanism and locking means movable and held in either of two positions and in one position blocking movement of the releasing means to the second position thereof and in another position blocking movement of the releasing means from the second position thereof.

One form of construction of the subject of the invention is shown by way of example in the accompanying drawing, wherein.

Figure 1:
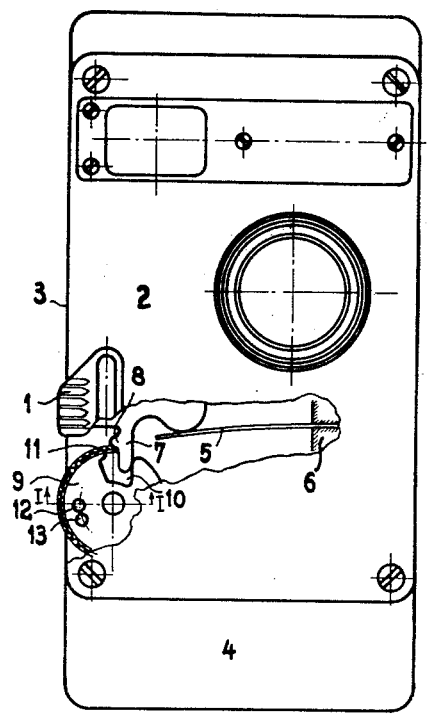
Fig. 1 is a front view, with portions broken away, of a photographic camera provided with a device of this character.
Figure 2:
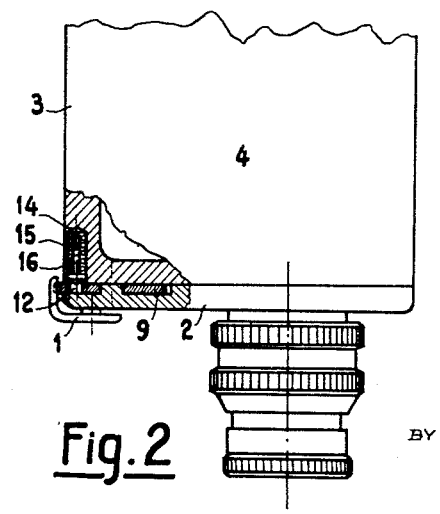
Fig. 2 shows the front part of the same camera seen in plan, with a partial section on the line I—I of Fig. 1.

A release lever 1, of the general shape of an angle iron, is mounted on an edge limiting the faces 2 and 3 of a photographic camera 4. The lever 1 is movable vertically and is held in its upper position by a blade spring 5, of which one end is enclosed in a stationary part 6 of the camera 4. The lever 1 is provided, on the inside of the camera, with a finger 7 carrying a lateral projection 8. Underneath the lever is located a locking member, constituted by a disc 9 journaled on and within a plate with the outer face 2 and having a notch 10 on the edge of which is provided a stop 11. Two bores 12 and 13 are drilled in the disc 9, in such a manner that by a rotation of the latter, they may be brought opposite a seating 14 into which is fitted a rod 15, with a conical head subjected to the action of a spring 16.

A portion of the disc is toothed and projects to the outside of the casing of the camera in such a manner as to be capable of being actuated by the operator.

The operation of the device is as follows: The setting in operation of the mechanism for driving the film is effected by lowering the lever 1 against the action of the spring 5. The disc 9, being in the position shown in the drawing, the finger 7 of the lever 1 can pass freely into the notch 10 of the disc 9, the latter being held in position by the conical head of the rod 15, which is applied against the bore 12. The projection 8 of the finger 7 is then in the notch 10, and a slight rotation of the disc 9, enables the lever 1 to be locked in its lower position, the projection 8 being retained by the stop 11. The disc 9 is held in place in this position by the conical head of the rod 15 which is applied against the bore 13. The locking member 9 also enables the locking lever 1 to be held in its upper position (that shown in the drawing), by causing it to turn in the same direction as before, in such a manner that the stop 11 is located underneath the projection 8, thus preventing the penetration of the finger 7 into the notch 10 of the disc 9. This position thus plays the part of a safety lock.

The device described above, has a number of advantages relatively to known devices. In particular, the release lever operating from top to bottom, and being accessible on two faces of the apparatus as also on one edge, allows of very considerable operability of the apparatus, as the operator can actuate it indifferently with the thumb or a finger of the right hand or of the left hand.

The locking device, located immediately underneath the release lever, effects the same movement for the locking when stopping and the locking in operation. It may be actuated by the same finger as that which effects the release, which allows of an extremely rapid operation, without it being necessary to raise the camera from the eye, during use.

Further, for a turret camera, it is advantageous for reasons of size, that the turret can pass over the release knob when it is operated. The flat shape of the said release lever allows this possibility directly.

It will be understood that numerous modifications may be applied to the device above described. For example, the blade spring 5 may be replaced by a coiled spring operating by expansion or compression. The locking member may project from the face 2 instead of from the face 3 and it may also be located above the release lever.

The finger 7 may also have two notches instead of the projection 8, with which notches the stop 11 engages.

I claim:

1. In a cinematographic camera having a film-driving mechanism the device for controlling said mechanism and comprising a control member movable from film-stopping to film-driving positions and extending to adjacent sides of the camera frame and having a finger carrying a projection, a disc journaled on the camera frame and having a recess opening through the disc periphery and receiving the finger, the disc also including a latch part adjacent the recess and in one angular position of the disc engaging over the projection after movement of the control member from film-stopping to film-driving position and thereby holding the control member in the film driving position, the latch part of the disc in a second angular position thereof being out of the path of motion of the projection, and means on the camera frame and disc and selectively holding the disc in either of the two mentioned angular positions.

2. The device according to claim 1 and wherein the camera frame includes a front plate with a recess on its inner side receiving part of the disc, and wherein the disc portion exterior to the camera frame is toothed and wherein the last means comprise a pair of holes in the disc and a spring-urged rod selectively engageable in one of the holes.

References Cited in the file of this patent

UNITED STATES PATENTS

| 1,131,160 | Pollock | Mar. 9, 1915 |
| 1,209,015 | Palmer | Dec. 19, 1916 |
| 1,905,522 | Stephenson | Apr. 25, 1933 |
| 1,912,749 | Wittel | June 6, 1933 |
| 1,965,442 | Wahnish | July 3, 1934 |
| 2,316,020 | Riddell | Apr. 6, 1943 |
| 2,482,571 | Arnold | Sept. 20, 1949 |